United States Patent
Huang

(10) Patent No.: US 11,580,832 B2
(45) Date of Patent: Feb. 14, 2023

(54) MOTION DETECTION SYSTEM AND METHOD

(71) Applicant: Himax Technologies Limited, Tainan (TW)

(72) Inventor: Tsung-Yau Huang, Tainan (TW)

(73) Assignee: Himax Technologies Limited, Tainan (TW)

( * ) Notice: Subject to any disclaimer, the term of this patent is extended or adjusted under 35 U.S.C. 154(b) by 316 days.

(21) Appl. No.: 17/079,255

(22) Filed: Oct. 23, 2020

(65) Prior Publication Data

US 2022/0130219 A1 Apr. 28, 2022

(51) Int. Cl.
*G08B 13/196* (2006.01)
*G06T 7/194* (2017.01)
*G06T 7/254* (2017.01)

(52) U.S. Cl.
CPC ........ *G08B 13/19602* (2013.01); *G06T 7/194* (2017.01); *G06T 7/254* (2017.01); *G08B 13/19667* (2013.01)

(58) Field of Classification Search
CPC . G06T 2207/10016; G06T 2207/20021; G06T 7/194; G06T 7/254; G08B 13/19602; G08B 13/19667
See application file for complete search history.

(56) References Cited

U.S. PATENT DOCUMENTS

| | | | | |
|---|---|---|---|---|
| 6,952,484 | B1 * | 10/2005 | Higginbottom | G06V 10/56 382/218 |
| 10,217,195 | B1 * | 2/2019 | Agrawal | G06T 7/11 |
| 10,306,203 | B1 * | 5/2019 | Goyal | H04N 13/271 |
| 10,757,369 | B1 * | 8/2020 | Mukhopadhyay | H04N 7/181 |
| 10,891,525 | B1 * | 1/2021 | Olgiati | G06T 9/002 |
| 2002/0037103 | A1 * | 3/2002 | Hong | G06T 7/194 382/173 |
| 2002/0186881 | A1 * | 12/2002 | Li | G06T 11/00 382/164 |

(Continued)

OTHER PUBLICATIONS

P. Kaew TraKulPong et al., An Improved Adaptive Background Mixture Model for Real-Time Tracking with Shadow Detection, In Proc. 2nd European Workshop on Advanced Video Based Surveillance Systems, AVBS01, Sep. 2001, Video Based Surveillance Systems: Computer Vision and Distributed Processing, Kluwer Academic Publishers.

*Primary Examiner* — Peter D Le
(74) *Attorney, Agent, or Firm* — Donald E. Stout; Stout, Uxa & Buyan, LLP

(57) ABSTRACT

A motion detection method includes providing a buffer including a first buffer associated with a background image and a second buffer associated with a foreground image; checking first similarity between the gray level of an input pixel and the first gray level of the first buffer; determining the input pixel as a still pixel if the first similarity is true; checking second similarity between the gray level and the second gray level of the second buffer; determining the input pixel as a moving pixel if the second similarity is false; determining the input pixel as the moving pixel if the second count value is less than the first count value; and determining the input pixel as the still pixel and swapping the first buffer with the second buffer, if the second count value is not less than the first count value.

9 Claims, 3 Drawing Sheets

(56) References Cited

U.S. PATENT DOCUMENTS

| | | | | |
|---|---|---|---|---|
| 2006/0158464 | A1* | 7/2006 | Bhattacharjya | G06F 21/84 345/644 |
| 2007/0206865 | A1* | 9/2007 | Boregowda | G06V 20/52 348/E5.065 |
| 2007/0273765 | A1* | 11/2007 | Wang | G06V 10/28 348/152 |
| 2010/0098331 | A1* | 4/2010 | Meng | G06T 7/194 382/164 |
| 2015/0269745 | A1* | 9/2015 | Klimer | G06T 7/262 382/103 |
| 2018/0300905 | A1* | 10/2018 | Johnston | H04N 19/124 |
| 2019/0220982 | A1* | 7/2019 | Gottumukkal | G06T 7/254 |
| 2019/0313058 | A1* | 10/2019 | Harrison | G06T 7/194 |
| 2019/0371144 | A1* | 12/2019 | Shu | G08B 21/0476 |
| 2020/0193166 | A1* | 6/2020 | Russo | G06V 10/50 |
| 2021/0042914 | A1* | 2/2021 | Oosake | G06T 7/0012 |
| 2021/0233292 | A1* | 7/2021 | Yokota | G02B 27/0172 |
| 2021/0304425 | A1* | 9/2021 | Nakagomi | G06V 20/64 |
| 2022/0130219 | A1* | 4/2022 | Huang | G08B 13/19667 |
| 2022/0301275 | A1* | 9/2022 | Khadloya | G06V 20/46 |

* cited by examiner

MOTION DETECTION SYSTEM AND METHOD

BACKGROUND OF THE INVENTION

1. Field of the Invention

The present invention generally relates to a motion detection system and method, and more particularly to a motion detection system and method capable of substantially reducing buffers and reducing latency.

2. Description of Related Art

Motion detection is a process of detecting a change in the position of an object relative to its surroundings. Detection of motion may commonly be achieved by an optical system equipped with video and camera devices.

In a low-power application, intelligent computer vision is performed while consuming as little power as possible. An effective way to improve the power consumption is to keep a central processing unit (CPU) in sleep mode for as long as possible, and wake the CPU up only when some motion occurs in the scene.

The algorithms adopted in conventional motion detection commonly suffer complex computation that requires substantial resource and induces latency. Moreover, the complex architecture is not suitable for hardware design of implementing the motion detection in a real-time application. A need has arisen to propose a novel scheme to simplify the system, reduce latency and facilitate hardware design of implementing the motion detection.

SUMMARY OF THE INVENTION

In view of the foregoing, it is an object of the embodiment of the present invention to provide a motion detection system and method capable of substantially reducing buffers and reducing latency, suitable for hardware design of implementing the motion detection system, and facilitating pipelining for the motion detection system.

According to one embodiment, a motion detection method includes the following steps. An input pixel with a gray level is inputted. A buffer including a first buffer associated with a background image and a second buffer associated with a foreground image is provided. Each pixel of the first buffer includes a first gray level and an associated first count value, and each pixel of the second buffer includes a second gray level and an associated second count value. First similarity between the gray level and the first gray level is checked, and the input pixel is determined as a still pixel if the first similarity is true. Second similarity between the gray level and the second gray level is checked, and the input pixel is determined as a moving pixel if the second similarity is false. The input pixel is determined as the moving pixel if the second count value is less than the first count value. The input pixel is determined as the still pixel and the first buffer is swapped with the second buffer, if the second count value is not less than the first count value.

DETAILED DESCRIPTION OF THE INVENTION

Figure 1:
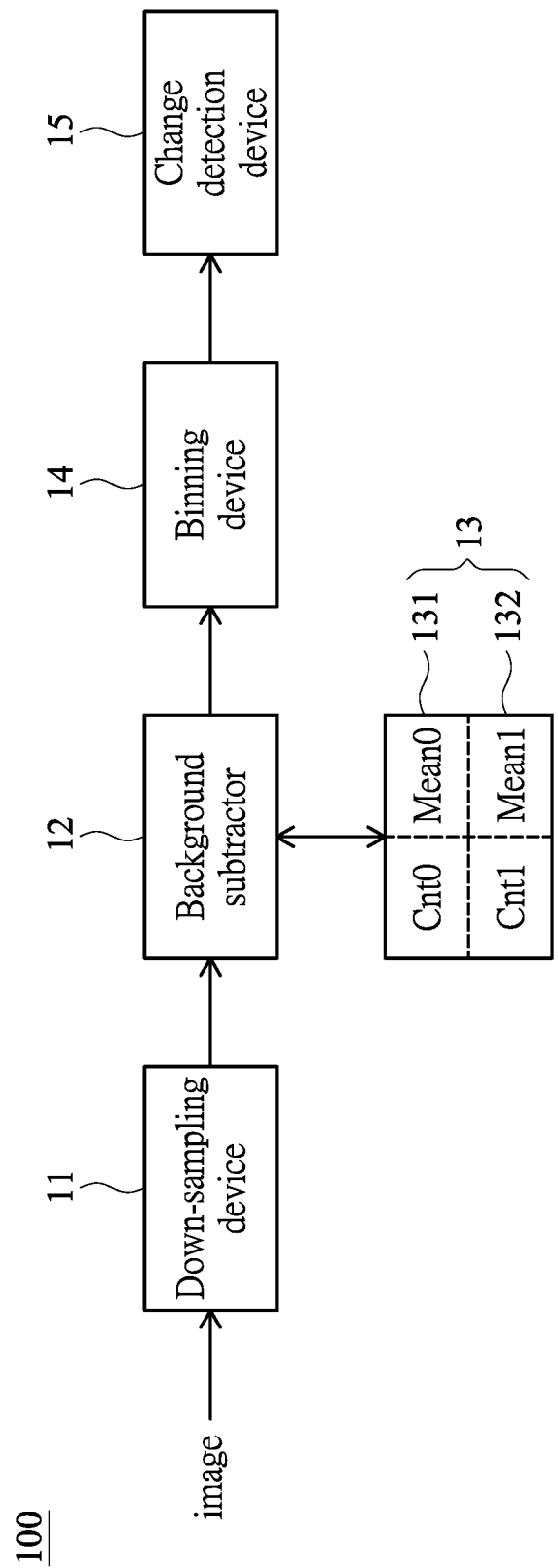
FIG. 1 shows a motion detection system according to one embodiment of the present invention.

FIG. 1 shows a motion detection system 100 according to one embodiment of the present invention. The components of the motion detection system 100 may be implemented by hardware, software or their combinations. Particularly, the motion detection system 100 of the embodiment proposes an architecture that is suitable for hardware design of implementing the motion detection system 100.

In the embodiment, the motion detection system 100 may include a down-sampling device 11 coupled to receive an image frame and configured to down-sample the image frame. Specifically, the image frame is down-sampled by subdividing the image frame into a plurality of blocks or bins.

Figure 2A:
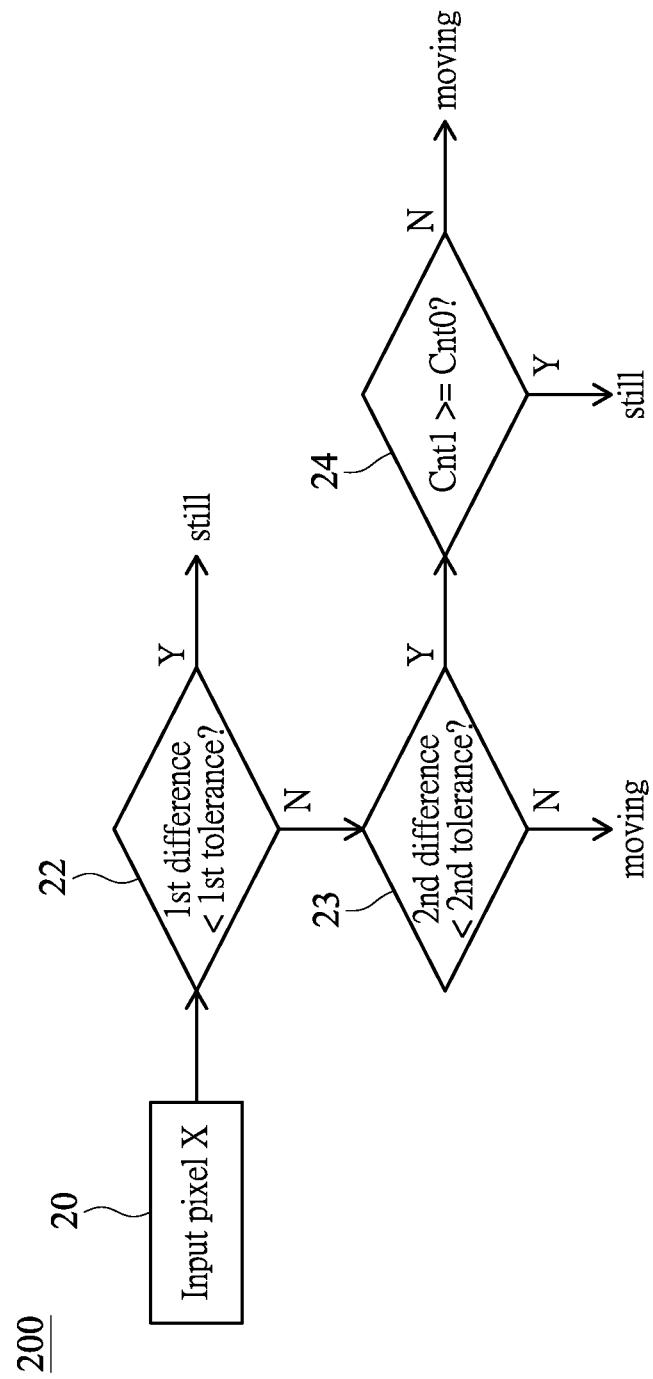
FIG. 2A shows a simplified flow diagram illustrating a motion detection method performed by the background subtractor of FIG. 1.
Figure 2B:
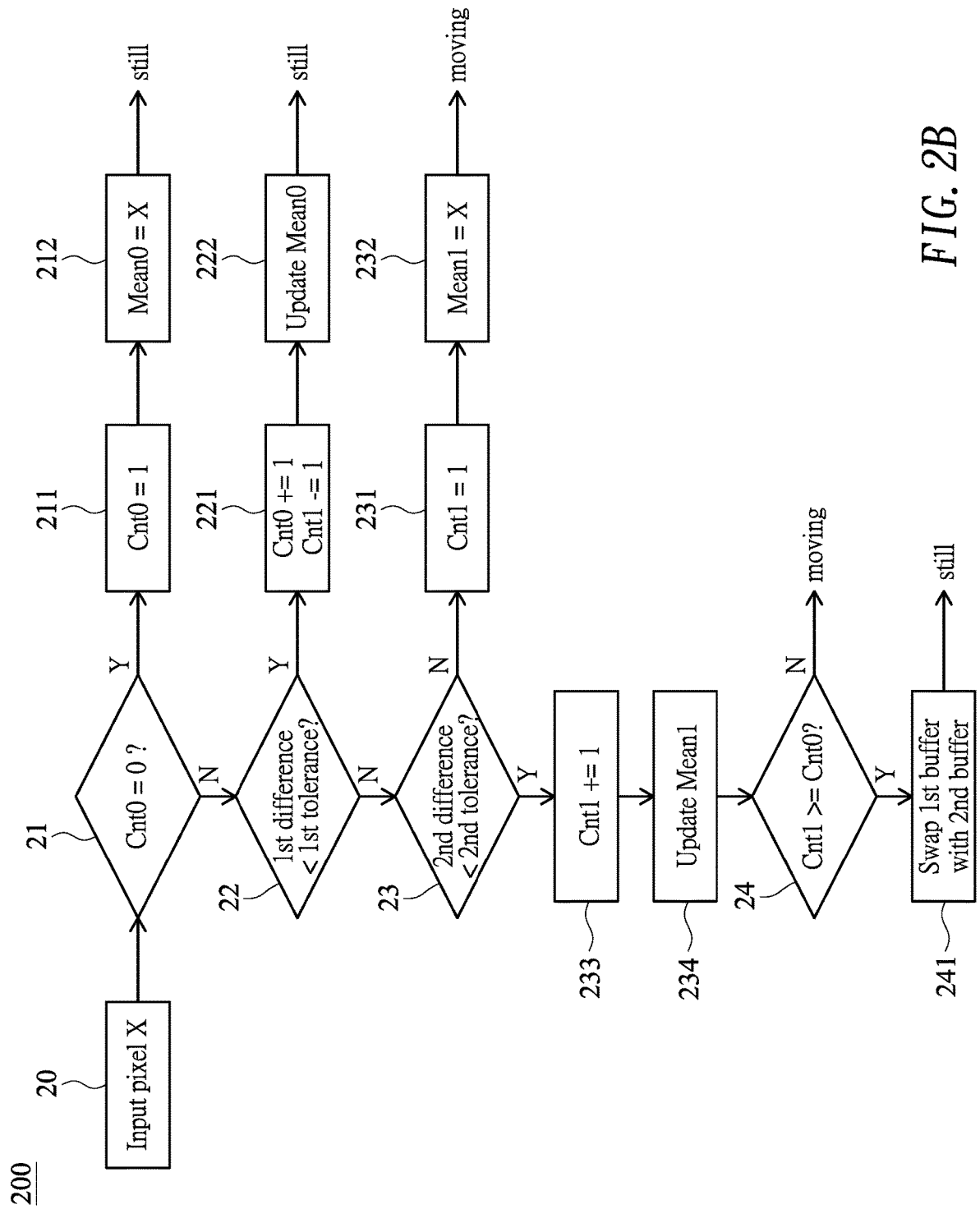
FIG. 2B shows a detailed flow diagram of FIG. 2A.

The motion detection system 100 of the embodiment may include a pixel-based background subtractor 12 configured to perform motion detection on each block of the image frame to determine moving pixels of the image frame (or the block). FIG. 2A shows a simplified flow diagram illustrating a motion detection method 200 performed by the background subtractor 12 of FIG. 1, and FIG. 2B shows a detailed flow diagram of FIG. 2A. In the embodiment, the motion detection system 100 may include a buffer 13 allocated to the background subtractor 12. Specifically, the buffer 13 may include a first buffer 131 associated with a background image and a second buffer 132 associated with a foreground image. Each pixel of the first buffer 131 may include a first gray level Mean0 and an associated first count value Cnt0. Each pixel of the second buffer 132 may include a second gray level mean1 and an associated second count value Cnt1. In one exemplary embodiment, the first buffer 131 and the second buffer 132 each has a size of 10 bits×(total pixel number of the image frame), where the (first/second) count value includes two bits and the (first/second) gray level includes eight bits.

In step 20, a pixel (of the image frame) with a gray level X is inputted. In step 21, an initial frame is determined. Specifically, the first count value Cnt0 is compared with "0." If the first count value Cnt0 is equal to "0," the pixel is determined as a still pixel, and "1" is assigned to the first count value Cnt0 (step 211) and the gray level X is assigned to the first gray level Mean0 (step 212); otherwise the flow goes to step 22.

According to one aspect of the embodiment, the motion detection is primarily performed by checking (first/second) similarity between the gray level X and the (first/second) gray level Mean0/Mean1, by first determining a (positive) difference between the gray level X and the (first/second) gray level Mean0/Mean1 and determining a tolerance of the gray level X and the (first/second) gray level Mean0/Mean1, followed by comparing the difference (i.e., |X−mean|) with the tolerance. In the embodiment, the difference and the tolerance are positive values. It is noted that the tolerance is a function of the gray level X and the (first/second) gray level. In one example, the tolerance is defined as follows:

$$\text{tolerance}(X, \text{mean}) = \text{round}(10 + 50 * X/255)$$

where round ( ) is an operator that rounds the computation into an integer. In one embodiment, all tolerances may be pre-calculated and stored as a lookup table.

In step 22, the first similarity between the gray level X and the first gray level Mean0 is checked. Specifically, if a (first) difference between the gray level X and the first gray level Mean0 (i.e., |X−Mean0|) is less than a (first) tolerance of the gray level X and the first gray level Mean0 (i.e., tolerance (X,Mean0)), the first similarity is denoted true and the pixel is determined as a still pixel, and the first count value Cnt0 is incremented by adding "1" thereto, the second count value Cnt1 is decremented (step 221), and the first gray level Mean0 is updated by the gray level X (step 222); otherwise the flow goes to step 23. In the embodiment, updating a (first/second) gray level may be performed by the following operations:

Mean=(Mean+$X$)>>1 when count value is equal to 2

Mean=(Mean<<1+Mean+$X$+2)>>2 when count value is equal to 3 where >> represents right bit shift, and << represents left bit shift.

In step 23, the second similarity between the gray level X and the second gray level Mean1 is checked. Specifically, if a (second) difference between the gray level X and the second gray level Mean1 (i.e., |X−Mean1|) is not less than a (second) tolerance of the gray level X and the second gray level Mean1 (i.e., tolerance (X,Mean1)), the second similarity is denoted false and the pixel is determined as a moving pixel, and "1" is assigned to the second count value Cnt1 (step 231) and the gray level X is assigned to the second gray level Mean1 (step 232). If the second similarity as determined in step 23 is true, the second count value Cnt1 is incremented by adding "1" thereto (step 233) and the second gray level Mean1 is updated by the gray level X (step 234), and the flow then goes to step 24.

In step 24, if the second count value Cnt1 is less than the first count value Cnt0, the pixel is determined as a moving pixel; otherwise the pixel is determined as a still pixel, and the first buffer 131 (i.e., Cnt0 and Mean0) is swapped with the second buffer 132 (i.e., Cnt1 and Mean1) (step 241).

The motion detection system 100 of the embodiment may include a binning device 14 configured to accumulate the moving pixels (determined from the background subtractor 12) in the block (or bin). If the pixel number of the moving pixels is greater than a predetermined (first) threshold, the block is determined as an active block (or bin); otherwise the block is determined as an inactive block (or bin).

The motion detection system 100 of the embodiment may include a change detection device 15 configured to accumulate the active blocks (determined from the binning device 14) in the (current) image frame. If the block number of the active blocks is greater than a predetermined (second) threshold, the image frame is determined as an active frame, indicating that motion or change in the image frame is detected.

As the execution of the motion detection is pixel-based, the embodiment as proposed above may facilitate pipelining for the down-sampling (of the down-sampling device 11), the motion detection (of the background subtractor 12) and the binning (of the binning device 14). Therefore, buffer may be substantially saved and latency reduced.

Although specific embodiments have been illustrated and described, it will be appreciated by those skilled in the art that various modifications may be made without departing from the scope of the present invention, which is intended to be limited solely by the appended claims.

What is claimed is:

1. A motion detection method, comprising:
    (a) inputting an input pixel with a gray level;
    (b) providing a buffer including a first buffer associated with a background image and a second buffer associated with a foreground image, each pixel of the first buffer including a first gray level and an associated first count value, and each pixel of the second buffer including a second gray level and an associated second count value;
    (c) checking first similarity between the gray level and the first gray level;
    (d) determining the input pixel as a still pixel if the first similarity is true;
    (e) checking second similarity between the gray level and the second gray level;
    (f) determining the input pixel as a moving pixel if the second similarity is false;
    (g) determining the input pixel as the moving pixel if the second count value is less than the first count value; and
    (h) determining the input pixel as the still pixel and swapping the first buffer with the second buffer, if the second count value is not less than the first count value.

2. The method of claim 1, further comprising the following step after the step (c) or (e):
    adding "1" to the first count value or the second count value, and updating the first gray level or the second gray level by the gray level, if the corresponding first or second similarity is true.

3. The method of claim 1, wherein if the first similarity is true, further comprising the following steps after the step (c):
    (c1) incrementing the first count value, and decrementing the second count value; and
    (c2) updating the first gray level by the gray level.

4. The method of claim 1, wherein the first similarity is checked by comparing a first difference between the gray level and the first gray level with a first tolerance, and the second similarity is checked by comparing a second difference between the gray level and the second gray level with a second tolerance.

5. A motion detection system, comprising:
    a down-sampling device that down-samples an image frame by subdividing the image frame into a plurality of blocks;
    a pixel-based background subtractor that performs motion detection on each block of the image frame to determine still pixels and moving pixels;
    a buffer allocated to the background subtractor, the buffer including a first buffer associated with a background image and a second buffer associated with a foreground image, each pixel of the first buffer including a first gray level and an associated first count value, and each pixel of the second buffer including a second gray level and an associated second count value;
    a binning device that accumulates the moving pixels in the block, which is determined as an active block if a number of the moving pixels is greater than a predetermined first threshold; and
    a change detection device that accumulates the active blocks in the image frame, which is determined as an active frame if a number of the active blocks is greater than a predetermined second threshold.

6. The system of claim 5, wherein the background subtractor performs the following steps:
    (a) inputting an input pixel with a gray level;
    (c) checking first similarity between the gray level and the first gray level;
    (d) determining the input pixel as a still pixel if the first similarity is true;
    (e) checking second similarity between the gray level and the second gray level;

(f) determining the input pixel as a moving pixel if the second similarity is false;

(g) determining the input pixel as the moving pixel if the second count value is less than the first count value; and (h) determining the input pixel as the still pixel and swapping the first buffer with the second buffer, if the second count value is not less than the first count value.

7. The system of claim 6, further comprising the following step after the step (c) or (e):

adding "1" to the first count value or the second count value, and updating the first gray level or the second gray level by the gray level, if the corresponding first or second similarity is true.

8. The system of claim 6, wherein if the first similarity is true, further comprising the following steps after the step (c):

(c1) incrementing the first count value, and decrementing the second count value; and (c2) updating the first gray level by the gray level.

9. The system of claim 6, wherein the first similarity is checked by comparing a first difference between the gray level and the first gray level with a first tolerance, and the second similarity is checked by comparing a second difference between the gray level and the second gray level with a second tolerance.

* * * * *